United States Patent [19]

Hopkins

[11] Patent Number: 5,020,309
[45] Date of Patent: Jun. 4, 1991

[54] LEAF SHREDDER ATTACHMENT FOR A MOWER BAGGING SYSTEM

[75] Inventor: John W. Hopkins, Charlotte, N.C.

[73] Assignee: Textron, Inc., Providence, R.I.

[21] Appl. No.: 433,682

[22] Filed: Nov. 8, 1989

[51] Int. Cl.⁵ .............. A01D 34/12; A01D 34/70; A47L 5/24; B02C 13/288
[52] U.S. Cl. .................. 56/13.3; 56/16.6; 56/13.9; 56/202; 56/DIG. 9; 15/330; 241/56; 241/101.7; 241/292.1
[58] Field of Search .............. 56/13.3, 16.6, 202, 56/12.8, 13.9, 60, 61, 320.2, DIG. 9; 241/101.1, 101.7; 15/330, 405, 409

[56] References Cited

U.S. PATENT DOCUMENTS

| | | | |
|---|---|---|---|
| 2,920,435 | 1/1960 | Vallone | 56/13.3 |
| 3,353,268 | 11/1967 | Meltzer | 30/276 |
| 3,657,865 | 4/1972 | Ober | 56/13.3 |
| 3,790,094 | 2/1974 | Spicer | 56/13.3 X |
| 3,925,968 | 12/1975 | Wagenhals | 56/13.3 |
| 4,114,353 | 9/1978 | Ansbaugh et al. | 56/13.3 |
| 4,290,165 | 9/1981 | Hiramatsu et al. | 15/330 |
| 4,325,163 | 4/1982 | Mattson et al. | 15/330 X |
| 4,443,997 | 4/1984 | Namdari | 56/13.3 |
| 4,711,073 | 12/1987 | Freier, Jr. et al. | 56/13.3 |
| 4,722,139 | 2/1988 | Mahler | 30/124 |
| 4,735,037 | 4/1988 | Benter | 56/13.3 |
| 4,761,943 | 8/1988 | Parker et al. | 56/202 |
| 4,875,630 | 10/1989 | Carlson | 241/56 |

Primary Examiner—Stephen J. Novosad
Attorney, Agent, or Firm—Perman & Green

[57] ABSTRACT

A shredder attachment for use with lawn machines having vacuum or fan movement of shreddable material. The attachment comprises a frame suitably sized and shaped to be substantially mounted inside a conduit of a lawn machine. The attachment further comprises a cutter for cutting material passing through the conduit and a motor for driving the cutter. The attachment can be used in such lawn machines as a discharge conduit for a riding mower bagging system, an auxiliary cutter for a walk behind mower or a hand-held leaf vacuum.

21 Claims, 3 Drawing Sheets

LEAF SHREDDER ATTACHMENT FOR A MOWER BAGGING SYSTEM

BACKGROUND OF THE INVENTION

1. Field of the Invention

The present invention relates to lawn and garden machines and, more particularly, to a shredder attachment for use with motorized lawn and garden machines having vacuum or fan movement of shreddable material.

2. Prior Art

Various different lawn and garden machines or tools have been used in the art to perform multiple functions. One of these multiple functions is the collection of leaves, cut grass, or other material. A riding mower, for instance, can generally cut grass with either a side discharge or rear bagging of cut material. A riding mower can also use its rear bagging system to, at least partially, cut leaves and collect the leaves in its bagging system. Similarly, mobile vacuum systems have been used with riding tractors to collect leaves and hand held blower/vacuums have been used to collect and bag leaves.

A problem exists with the various different lawn and garden machines or tools used in the prior art in that, although the tools can collect leaves or other matter and bag or store the leaves for disposal, because of the relatively irregular shape of leaves, their relative rigidity, and their relatively large size, relative to the storage container, the storage container must be emptied relatively often because leaves do not lend themselves to compact storage. This is because of the leaves somewhat irregular shape and rigidity which produce relatively large air voids therebetween.

Another problem is that although leaf collectors, such as mowers, can partially cut leaves before they are moved to the leaf storage area or collecting container, lawn mowers with relatively large single blades do not shred leaves into sufficiently small pieces for compact storage. Therefore, the relatively large leaves or leaf portions that are delivered to a storage container allow for relatively large air voids therebetween and thus the storage container fills relatively rapidly requiring emptying of the storage container at relatively frequent intervals.

Another problem is that prior art leaf collectors do not sufficiently cut or shred leaves into small pieces which results in the above mentioned storage problems.

It is therefore an objective of the present invention to provide a shredder attachment for use with lawn and garden machines that can at least partially shred material, such as leaves, prior to storage in a collecting container.

It is another objective of the present invention to provide a shredder attachment for use with a leaf collector that can substantially shred leaves into relatively small pieces.

It is another objective of the present invention to provide a shredder attachment for use with a lawn or garden machine for collecting material, such as leaves, in a collecting container that can substantially diminish the size of air voids in collected material and thereby allow for collection of a larger amount of material in a container.

It is another objective of the present invention to provide a leaf shredder attachment for use in a riding mower bagging system that can allow for fewer stops for emptying of a container of the system thereby reducing the time it takes to complete the riding of the mower over a given area.

It is another objective of the present invention to provide a leaf shredder and collector that can shred leaves into relatively small pieces, thus reducing the volume of collected leaves for easier and less expensive disposal.

SUMMARY OF THE INVENTION

The foregoing problems are overcome and other advantages are provided by a shredder for use with a motorized lawn or garden machine for collecting material such as leaves and a method of manufacturing the same.

In accordance with one embodiment of the invention, a shredder for use in a discharge conduit that provides a substantially closed path between a primary cutting area and a cut material catcher of a riding mower is provided. The shredder generally comprises frame means, drive means and means for cutting shreddable material. The frame means is suitably sized and shaped to be substantially mounted inside a discharge conduit. The drive means is fixedly connected to the frame means and has a drive shaft axially rotatable relative to the frame means. The means for cutting shreddable material can cut material passing through the discharge conduit from a primary cutting area to a cut material catcher. The cutting means comprises a cutter and means for connecting the cutter to the drive shaft of the drive means. The cutting means is suitably sized and shaped for rotation within a discharge conduit such that the cutter can shred shreddable material passing through a discharge conduit into relatively small pieces allowing for a denser storage of material in a cut material catcher with smaller air voids in the material whereby a relatively large amount of material can be collected in a catcher.

In accordance with another embodiment of the present invention a discharge tube for use with a mower having a primary cutting area and being capable of exiting cut material from the primary cutting area through the discharge tube is provided. The discharge tube comprises frame means, means for connecting the frame means to a mower, and means for cutting material passing through the frame means. The frame means forms a substantially rigid conduit having a first open end and a second open end. The connecting means allows for connecting the first end of the frame means to a mower for receiving cut material from a primary cutting area of the mower. The means for cutting material passing through the frame means can cut material passing through the frame means conduit such that material exiting the conduit through the second end has been cut into relatively small pieces by the cutting means.

In accordance with another embodiment of the present invention, a leaf collector is provided comprising frame means, means for transporting leaves, and means for substantially shredding leaves passing through the frame means. The frame means has means for storing collected leaves and means for conduiting leaves to the storing means. The conduiting means has a second end connected to the storing means and a first end. The means for transporting leaves can transport leaves through the conduiting means from the first end of the frame means out the second end of the fame means. The means for substantially shredding the leaves can shred leaves passing through the conduiting means and comprises a leaf cutter mounted in the conduiting means and drive means for moving the leaf cutter such that leaves entering the conduiting means first end are cut while passing through the conduiting means to exit the conduiting means second end in relatively small pieces whereby a large amount of leaves can be collected in the storing means.

In accordance with one method of the present invention, a method of manufacturing a leaf cutting attachment for use with a leaf collecting device is provided. The method comprises the steps of connecting a cutter to a shaft; connecting the shaft to a frame member, the shaft being rotatably movable relative to the frame member; and connecting the frame member to a conduit tube for conduiting leaves, the frame member being fixedly connected to the tube such that the cutter is positioned inside the tube and can rotate therein such that the leaf cutting attachment can be connected to a mower for channeling leaves through the cutting attachment and cutting leaves as they pass therethrough.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
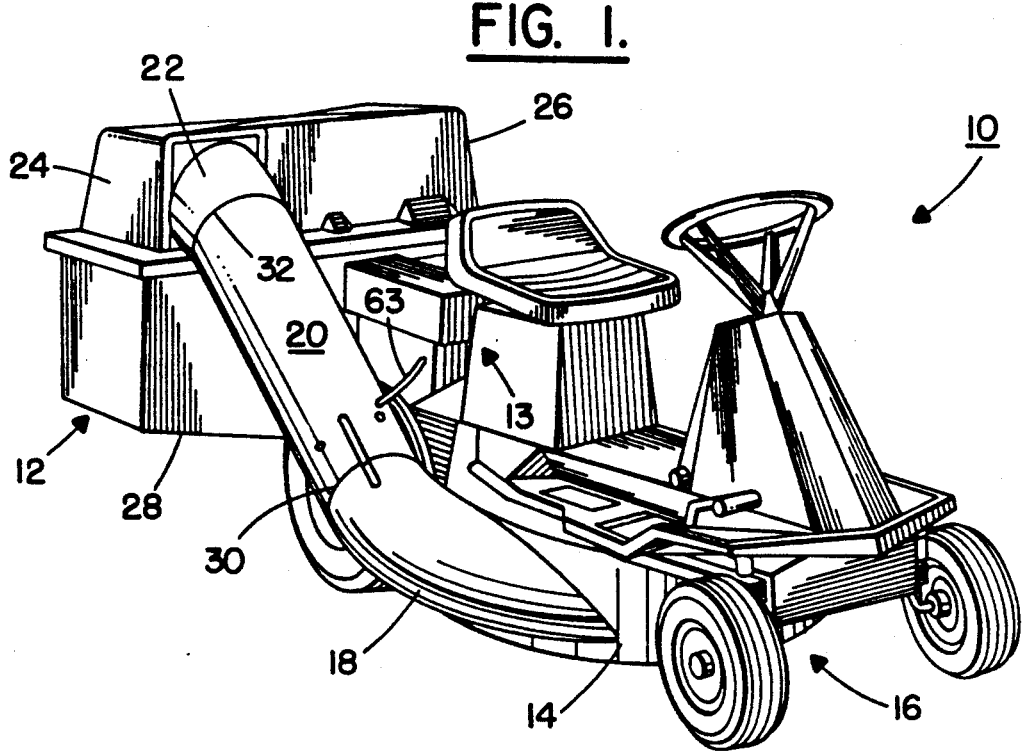
FIG. 1 is a perspective view of a riding mower having a mower bagging system incorporating features of the present invention.

Referring to FIG. 1, there is shown a perspective view of a riding lawn mower 10 having a mower bagging system 12 incorporating features of the present invention. It should be understood that although the features of the present invention will be primarily described with reference to use with lawn mowers, the present invention can be used in connection with any suitable type of lawn, yard, or garden collecting device or machine wherein the material being collected is of a shreddable nature. It should also be understood that the present invention can be embodied in many alternate forms and is not necessarily limited to the embodiments shown in the figures and may include any suitable size, shape, or type of materials without departing from the spirit of the invention.

The riding mower 10 generally comprises an engine 13, such as an internal combustion engine, and a mower deck 14 surrounding a primary cutting area 16 wherein a primary mower blade or blades (not shown) are rotated by the engine 13 both to cut grass and provide a strong vacuum or fan action to stand grass straight up for clean cutting, and to pick up grass cuttings, leaves, and other debris and discharge the vacuumed material from the primary cutting area 16 into the mower bagger system 12. In the embodiment shown, the mower bagger system 12 generally comprises a mower deck discharge tube 18, a center discharge tube 20, an elbow discharge tube 22 and a collection container 24 generally comprising a container body 28 and hood assembly 26. In the embodiment shown, the three discharge tubes 18, 20, 22 are provided as separate members which are removably connected to each other. However, in an alternate embodiment of the present invention, the three tubes 18, 20, and 22 may be provided as a single member. The mower deck discharge tube 18 generally provides a path from the primary cutting area 16 into the center discharge tube 20. The center discharge tube 20 has a center conduit 36 (See FIG. 2A) passing therethrough with a first end 30 removably connected to the mower deck discharge tube 18 and a second end 32 removably connected to the elbow discharge tube 22. The elbow discharge tube 22 generally provides a conduit or path into the container 24 wherein grass clippings, leaves and other debris can be deposited.

Figure 2A:
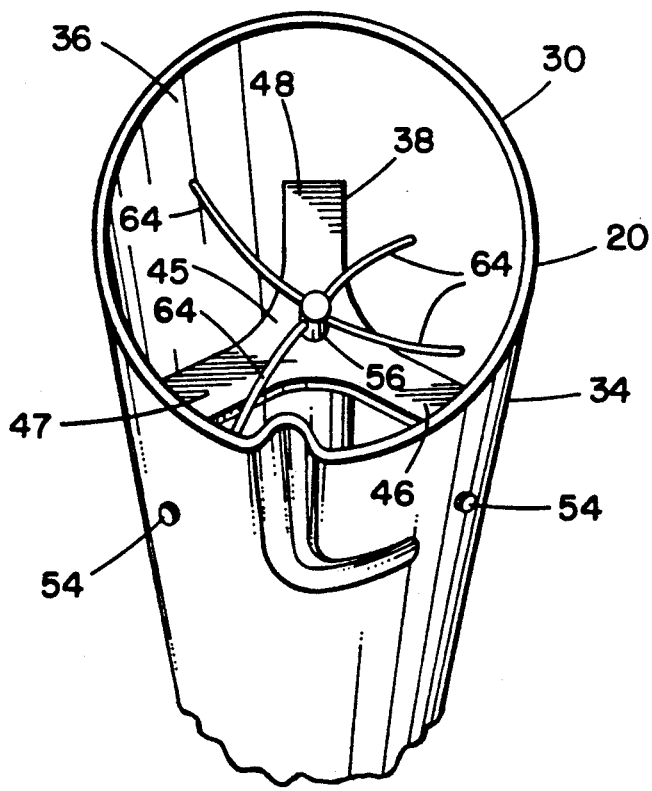
FIG. 2A is a partial perspective view of a discharge tube of the mower bagging system on the riding mower shown in FIG. 1.
Figure 2B:
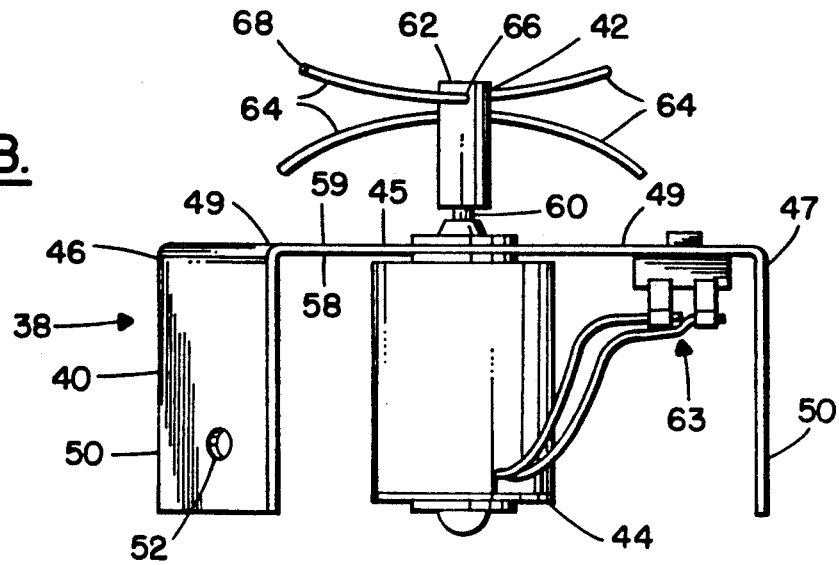
FIG. 2B is a plan side view of a shredder attachment of the discharge tube shown in FIG. 2A incorporating features of the present invention.

Referring also to FIG. 2A, a partial perspective view of the center discharge tube 20 proximate its first end 30 is shown. As can be seen, the center tube 20 has a relatively thin structural wall 34 which forms a center conduit 36 between the first end 30 and second end 32. In the embodiment shown, located inside the center tube 20 in the conduit 36 proximate the tube's first end 30 is a shredding device 38. Referring also to FIG. 2B, a plan side view of the shredding device 38 of FIG. 2A is shown. In the embodiment shown, the shredding device 38 generally comprises a frame 40, a shredder or cutter 42 and a drive motor 44. The frame 40 is generally comprised of any suitable material such as metal and generally comprises a center portion 45 and three legs 46, 47, and 48. Each leg 46, 47 and 48 generally comprises a branch portion 49 extending away from the center portion 45 at substantially equal angles and end portions 50 of the legs which are substantially perpendicular to the branch portions 49 at the ends of the legs. The end portions 50 may be provided as substantially flat, however, they may also be suitably shaped to mate with the curved inner side of the center tube wall 34 when inserted into the inner conduit 36. In the embodiment shown, each of the end portions 50 comprise a mounting aperture 52 passing therethrough for passage of a fastener (not shown), such as a screw or bolt therethrough. In the embodiment shown, the wall 34 of the center tube 20 is generally provided with three mounting apertures 54 suitably spaced relative to each other such that when the shredding device 38 is inserted into the center conduit 36 the frame mounting apertures 52 can be aligned with the tube mounting apertures 54 with suitable fasteners passing therethrough to fixedly, but removably, connect the shredding device 38 to the center discharge tube 20. However, any suitable means may be provided for connecting the shredding device 38 to the center tube 20 including means which would not allow for the removability of the shredding device from the tube. In addition, any suitable number of legs may be provided or any suitable type of frame may be provided for fixedly mounting the drive motor 44 and cutter 42 inside the discharge tube 20. In the embodiment shown, the frame 40 comprises an aperture 56 passing through the center portion 45. The drive motor 44 is suitably connected to a first side 58 of the frame 40 proximate the aperture 56. A shaft 60 generally extends from the drive motor 44 up through the aperture 56 extending outward from a second side 59 of the frame. A cutter connecting device 62 is fixedly connected to the shaft 60 and provides a means for fixedly, but removably connecting the cutter 42 to the shaft 60. The drive motor 44, in the embodiment shown, is generally comprised of an electric motor which can axially rotate the shaft 60. Suitable means 63 are provided for providing electricity from the engine 13 to the drive motor 44 such as a small generator (not shown) connected to the engine 13 which can produce electricity and deliver the electricity to the drive motor 44 via suitable conductor wires. However, any suitable type of means may be provided to drive the cutter and need not be an electric motor.

In the embodiment shown, the cutter or shredder 42 is comprised of four string-like members 64. The string-like members 64 each have an inner end 66 and an outer end 68. Each of the inner ends 66 are suitably connected to the cutter connecting device 62 such that when the drive motor 44 rotates the shaft 60, the string-like members 64 are rotated about the center axis of the center discharge tube 20 with their outer ends 68 slightly spaced from the inner surface of the wall 34. In a preferred embodiment of the present invention, the cutter connecting device 62 is suitably adapted to allow for relatively easy removal and replacement of the string-like members if they become worn or damager during shredding. Each string-like member 64 is generally comprised of a plastic or polymer material and is somewhat rigid, but flexible. However, any suitable type of material or combination of materials can be used such as a metal wire coated with a polymer coating or cover. The string-like members 64 may have any suitable size thickness and can also be provided as tubular members if so desired. Although four string-like members 64 have been described above, any suitable number of string-like members may be provided including 1, 2, 3 or more. In addition, the string-like members may be provided such that their centers are attached to the connector 62 with their two ends extending therefrom.

Figure 3:
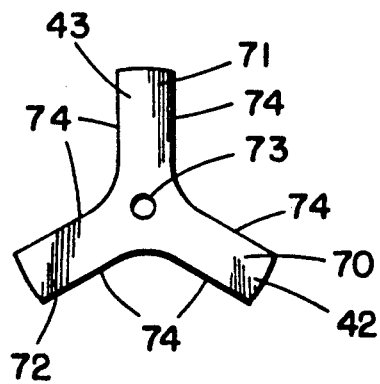
FIG. 3 is a plan top view of an alternate type of cutter for use in the shredder attachment shown in FIG. 2B.

Referring also to FIG. 3, there is shown an alternate embodiment of a cutter or shredder 42. In the embodiment shown, the cutter 42 is generally comprised of a relatively rigid blade member 43 having three legs 70, 71 and 72. An aperture 73 is provided for mounting the blade 43 to the connector 62 or alternatively, to the shaft directly. In the embodiment shown, the blade 43 is generally provided with relatively sharp edges 74 on both sides of each leg 70, 71 and 72. The blade 43 is preferably made with a suitable material such as hardened steel and when rotated by the drive motor 44 and shaft 60 can cut through or shred material passing through the center conduit 36 of the tube 20. Each leg 70, 71 and 72 has both of its edges 74 as cutting edges such that in the event one of the edges on each side of the legs become dull or damaged, the blade 43 can be removed from the shaft 60, reversed, and mounted back onto the shaft 60 such that the opposite edge of each leg can now be used for cutting purposes. This blade reversibility feature thus gives a new set of cutting edges to provide a longer and harder working life for the blade 43. Although a string-like cutter and a blade like cutter have been described above, any suitable type of cutter or shredder may be provided with the shredding device 38. The blade 43 may have any suitable shape for cutting or shredding purposes, but may also be shaped to help provide a fan-like action, similar to the mower blade (not shown), to propel material through the mower bagging system 12.

For the embodiment shown in FIGS. 1, 2A and 2B, an operator can use the riding lawn mower 10 for both cutting grass and collecting leaves and other debris and for storing the material in the collecting container 24. Generally, the mower blade (not shown) located under the mower deck 14 cooperates with the mower deck and the mower deck discharge tube 18 to cut material located in the primary cutting area 16 and exit the cut material through the mower deck discharge tube 18 via a lifting vacuum or fan action created by the mower blade (not shown) as it rotates. The cut grass, leaves, and other material are pushed through the discharge tubes 18, 20 and 22 by the fan-like action of the mower blade (not shown). As the material enters the center discharge tube 20 it passes into the cutting area of the cutter 42 and its string-like members 64. Because the shaft 60 is being axially rotated by the drive motor 44, the string-like members 64 revolve about the center axis of the shaft 60 and the center axis of the tube 20 at a relatively high speed such that shreddable material, such as leaves or grass clippings, being pushed past the cutter 42 by the fan-like action of the mower blade (not shown) are impacted upon by the string-like members 64 which effectively cut or shred the material passing through the cutting area of the shredding device 38. Because the string-like members 64 are rotating at a relatively high speed, they substantially prevent any material from being clogged on the frame 40. The shreddable material, once shred, can continue along the path of the discharge tubes 20 and 22 and be deposited in the collecting container 24. It should be understood that the term shred and variations thereof as used herein is generally intended to mean the tearing, cutting or shearing of material into relatively small pieces.

Obviously, as the shreddable material passes through the cutting area of the shredding device 38 it is cut or shredded into smaller pieces. Because the shreddable material has been cut or shredded into smaller pieces various advantages are gained. First, because the shreddable material is in smaller pieces, the pieces are relatively easier to be moved by the flow of air from the fan-like action of the mower blade (not shown). Thus, the relatively small pieces can be more easily and quickly transported to the container 24, reducing the risk of clogging of shreddable material in the discharge tubes. Second, when the shreddable material is exited from the elbow discharge tube 22 into the container 24 it settles in the container 24. Because the shreddable material has been shred into relatively small pieces, the settling of the shredded material occurs in a denser manner, having relatively small air voids between collected material, thus allowing for collection of a larger amount of material in a more compact density in the container 24. Third, because collected material in the container 24 is being stored in the container in a relatively denser and more compact manner, it takes longer for the container to become full. This allows for fewer stops of the mower 10 by an operator for the purpose of emptying the container 24 when it becomes full Thus, this can reduce the time it takes to complete the operation of the mower 10 over a given area. Fourth, because collectible material can be collected in a relatively denser and more compact manner, disposal of the collected material is relatively easier and can be less expensive, such as by using less trash bags to eventually dispose of the material. As is evident from the above description, the present invention may be embodied in various forms or alternatives. Obviously, any suitable type of conduiting system may be provided. Any suitable type of vacuum or fan action for moving the shreddable material through the conduiting system may be provided. Any suitable type of container may also be provided.

Preferably, the shredding device 3B is removably mounted in the center tube 20 and can be removed such as in the springtime when cutting of dense, heavy and tall grass is necessary wherein even the slightest obstruction to the passage of grass clippings through the tubes may result in clogging of the tubes. Thus, the means for fastening the shredding device 38 to the center tube 20 may be comprised of means for relatively readily, easily and quickly mounting and dismounting the shredding device 38 with the tube 20. Although the present invention has been described as having the shredding device 38 located proximate the first end 30 of the center tube 20, it can be located anywhere in the three tubes 18, 20 and 22. In addition, the mower bagger system 12 may comprise a plurality of shredding devices 38 in series or in parallel arrangement. The shredding device 38 may also be at least partially located outside the discharge tube 20. In addition, any suitable control may be provided on the riding mower 10 to activate, deactivate or modulate the drive motor 44.

Figure 4:
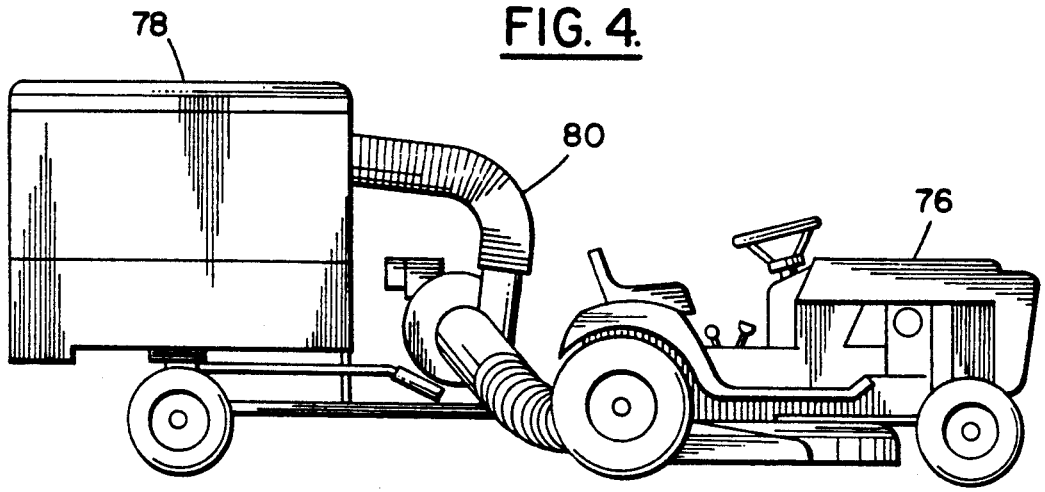
FIG. 4 is a plan side view of a lawn tractor having a leaf vacuum cart.
Figure 5:
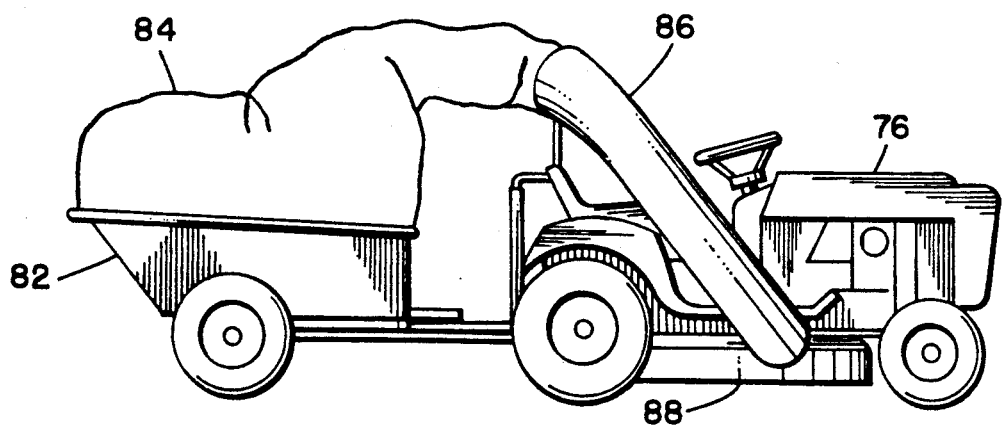
FIG. 5 is a plan side view of a lawn tractor with a trailer grass catcher system.

Referring now to FIG. 4, an alternate embodiment of the present invention is shown. In the embodiment shown, a yard tractor 76 is provided with a vacuum cart 78 having a conduit system 80. Obviously, the conduit system 80 may be provided with a shredding device such as shown in FIG. 2B anywhere along its length or at a plurality of locations along its length. Referring also to FIG. 5, an alternate embodiment of the present invention is shown wherein a yard tractor 76 is provided with a trailer 82 having a bagging system 84 connected to a mower deck 88 via a conduit system 6. A shredding device such as that shown in FIG. 2B may be positioned in the conduit system 86 at any suitable location or at a plurality of locations. The bagging system 84 may be comprised of any suitable bagging system such as a SUPER BAGGER, a trademark of Textron, Inc. of Providence, R.I.

Figure 6:
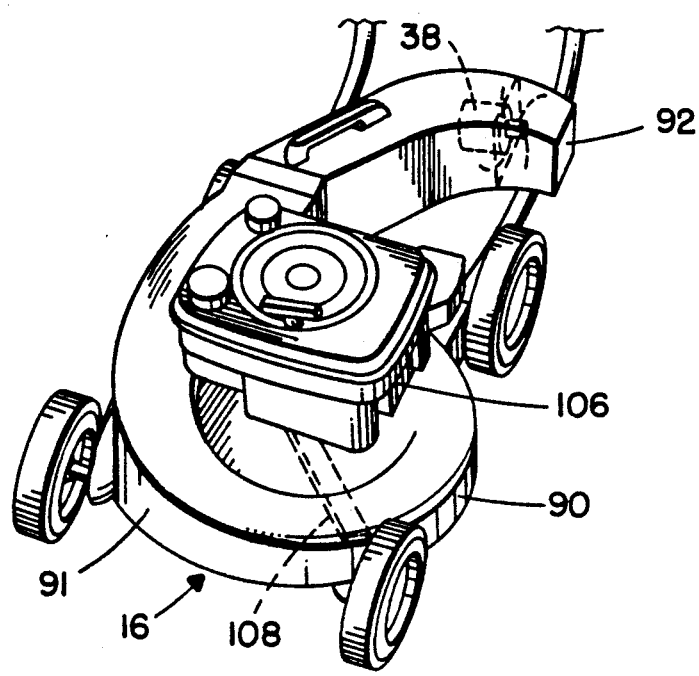
FIG. 6 is a perspective view of a walk-behind lawn mower having a side discharge tube with a shredder attachment therein.

Referring now to FIG. 6, an alternate embodiment of the present invention is shown. In the embodiment shown, a walk behind mower 90 is shown having a side discharge tube 92. The mower 90 generally has an engine 106, a frame 91 substantially defining a primary cutting area 16, and a primary cutting blade 108. Located inside the side discharge tube 92 is a shredding device 38 substantially similar to the shredding device shown in FIG. 2B. In the embodiment shown, although the shreddable material is not being collected, but rather is being discharged back onto a lawn, the combination of the primary mower blade (not shown) and the shredding device 38 allow for the shredding of material into a relatively fine mulch-like discharge as relatively small pieces. Because the grass clipping and other shreddable material are being side discharged, this substantially prevents the clogging of grass clippings under the mower deck of the mower 90 as is common with mowers producing mulch from grass clippings.

Figure 7:
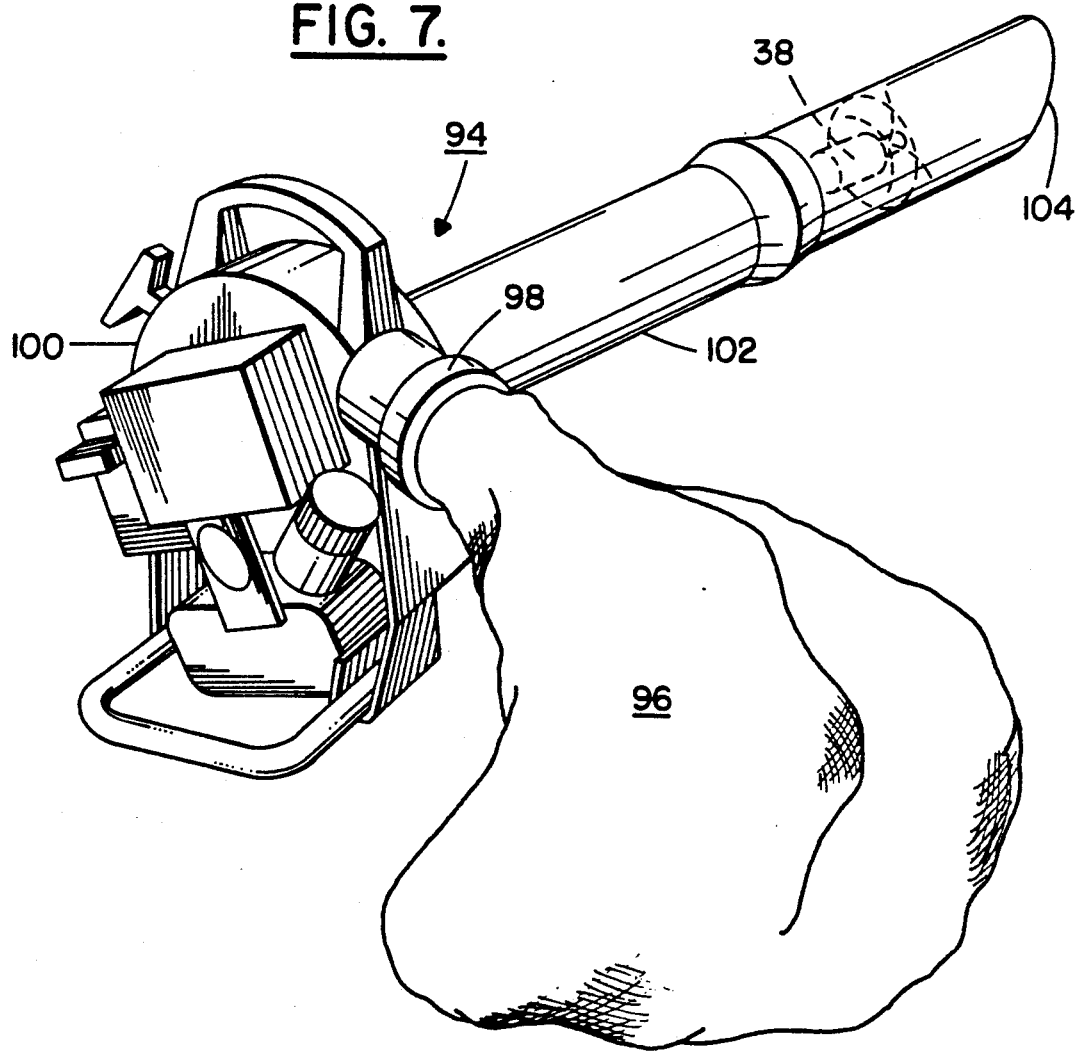
FIG. 7 is a perspective view of a hand-held leaf blower/vacuum having a shredder attachment therewith.

Referring now to FIG. 7, there is shown an alternate embodiment of the present invention wherein a shredding device 38 is provided with a hand-held blower/vacuum 94. The blower/vacuum 94 in the embodiment shown is arranged for a vacuum configuration having a bag 96 connected to its discharge 98 for bagging collected leaves. The blower/vacuum 94 generally comprises a vacuum motor 100 and a main tube 102. In the embodiment shown, the shredding device 38 is located in the main tube 102 and supplied with electricity generated from the vacuum motor 100. The motor 100 can generally create a vacuum in the main tube 102 such that shreddable material such as leaves can be sucked into an entrance 104 of the main tube 102 and exited from the vacuum motor 100 via the discharge tube 98 into the bag 96. As shreddable material passes through the cutting area of the shredding device 38 it can be shred into relatively small pieces for better collection and storage of the shreddable material in the bag 96. In an alternate embodiment of the present invention, the shredding device 38 need not be provided in the main tube 102, but rather may be provided in the discharge tube 98. In another alternate embodiment of the present invention, the shredding device 38 need not be provided with an electrical drive motor, but rather may be provided with a mechanical drive means connected to the vacuum motor 102 such as a cable or flexible shaft which can drive the cutter or shredder of the shredding device 38.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A shredder for use in a discharge conduit that provides a substantially closed path between a primary cutting area and a cut material catcher of a riding mower, the shredder comprising:

frame means suitably sized and shaped to be substantially mounted inside a discharge conduit, said frame means comprising at least two legs extending from a center portion thereof and being connectable to the discharge conduit;

drive means fixedly connected to said frame means, said drive means having a drive shaft axially rotatable relative to said frame means; and means for cutting shreddable material passing through the discharge conduit from a primary cutting area to the cut material catcher, said cutting means comprising a cutter and means for connecting said cutter to said drive shaft, said cutting means being suitably sized and shaped for rotation within the discharge conduit such that said cutter can substantially shred shreddable material passing through the discharge conduit into relatively small pieces allowing a denser storage of material in the cut material catcher with relatively small air voids in the material, and said frame being adapted to support said drive means and said means for cutting inside the discharge conduit such that said drive means and means for cutting can be wholly contained inside the discharge conduit whereby a relatively large amount of material can be collected in the catcher and containment of said drive means and means for cutting inside the discharge conduit increases safety to an operator of the mower.

2. A shredder as in claim 1 wherein said legs extend away from said center portion substantially perpendicular to said drive shaft and having end portions substantially parallel to said drive shaft.

3. A shredder as in claim 1 wherein said frame means comprises at least three legs which extend away from said center portion with substantially equal angles therebetween forming spaces therebetween.

4. A shredder as in claim 1 wherein said drive means comprises an electric motor connected to a second side of said frame means with said drive shaft extending from said electric motor through said frame means and extending outwardly from a first side of said frame means.

5. A shredder as in claim 1 wherein said cutter comprises a string-type cutter.

6. A shredder as in claim 5 wherein said string-type cutter comprises multiple string members extending from said means for connecting said cutter to said drive shaft substantially perpendicular to said shaft and suitably sized and shaped for rotation in a discharge conduit.

7. A shredder as in claim 1 wherein said cutter comprises a relatively rigid multi-leg blade.

8. A discharge conduit for use with a mower, the discharge conduit comprising:
a housing having a general tube shape with a center passage therethrough; and
a shredder as claimed in claim 1 fixedly connected to said housing in said center passage.

9. A discharge tube for use with a mower, the mower having a primary cutting area and being capable of exiting cut material from the primary cutting area through the discharge tube, the discharge tube comprising:
frame means forming a substantially rigid conduit with a first open end and a second open end;
means for connecting said first end to the mower for receiving cut material from the primary cutting area; and
means for cutting material passing through said frame means conduit including an electric motor mounted in said conduit having at least one string-type member mounted to said motor for rotation in said conduit such that material passing through said conduit can be cut into relatively small pieces by said cutting means.

10. A tube as in claim 9 wherein said connecting means comprises means for connecting said frame means first end to an adapter chute connected to a cutting deck of a mower.

11. A tube as in claim 9 wherein said frame means comprises a removable discharge elbow conduit connectable to a storage container cover.

12. A tube as in claim 9 wherein said cutting means comprises:
a cutter frame member fixedly connected to said tube frame means in said conduit;
said electric motor being fixedly connected to said cutter frame member in said conduit and having a drive shaft extending therefrom; and
a cutter fixedly connected to said shaft and being axially rotatable with said shaft in said conduit.

13. A tube as in claim 12 wherein said cutter comprises multiple string members rotatable in said conduit for shredding material passing therethrough.

14. A walk-behind lawn mower having an engine, a mower frame substantially defining a primary cutting area, and a primary cutting blade and further comprising a discharge tube as in claim 10 wherein material can be cut by said primary cutting blade and exited from said primary cutting area through said discharge tube whereby the material passing through said discharge tube can be further cut in said discharge tube into a mulch and discharged from said discharge tube.

15. A leaf collector comprising:
frame means having means for storing collected leaves and means for conduiting leaves to said storing means, said conduiting means having a second end connected to said storing means and a first end;
means for transporting leaves through said conduiting means from said first end out said second end; and
means for substantially shredding leaves passing through said conduiting means comprising a leaf cutter mounted in said conduiting means and drive means comprising an electric motor mounted inside said conduiting means for moving said leaf cutter, said leaf cutter including at least one string-type member movably mounted in said conduiting means to shred leaves as they pass therethrough such that leaves entering said conduiting means first end are cut while passing through said conduiting means to exit said conduiting means second end in relatively small pieces whereby a relatively large amount of leaves can be collected in said storing means.

16. A leaf collector as in claim 15 wherein said means for transporting leaves through said conduiting means comprises a hand-held vacuum motor for sucking leaves through said conduiting means.

17. A leaf collector as in claim 15 wherein said means for transporting leaves through said conduiting means comprises a cutting deck and cutting blade of a lawn mower which blow leaves through said conduiting means.

18. A leaf collector as in claim 15 wherein said frame means and transporting means comprises a vacuum cart connectable to a mower deck of a lawn tractor.

19. A method of manufacturing a leaf cutting attachment for use with a leaf collecting device, the method comprising the steps of:
providing an electric motor with a shaft;
connecting a string-type cutter to the shaft;
connecting the electric motor to a frame member, the shaft being rotatably movable relative to the frame member; and
connecting the frame member to a conduit tube for conduiting leaves, the frame member being fixedly connected to the tube such that the motor and cutter are positioned inside the tube and the shaft can rotate therein such that the leaf cutting attachment can be connected to a mower for channeling leaves through the cutting attachment and, the shaft can be rotated to thereby revolve 20. A shredder tube for use in conduiting leaves in a leaf collector, the shredder tube comprising:
a conduit tube with a conduit therethrough;
a support frame at least partially mounted inside said conduit;
a motor with a drive shaft, said motor being fixedly connected to said frame with said drive shaft fixedly but rotatably connected to said support frame, said motor being located inside said conduit; and a string-type cutter connected to said drive shaft for cutting shreddable material passing through said conduit.

21. A shredder for use in a conduit of a leaf collector, the shredder comprising:

a frame suitably sized and shaped to be mounted inside the conduit and adapted to allow shreddable material to pass therethrough;

an electric motor fixedly connected to said frame and having a rotatable drive shaft, said motor being located on one side of said frame and said shaft extending from said motor through a portion of said frame to an opposite side thereof; and a cutter connected to said drive shaft such that rotation of said drive shaft by said motor can rotate said cutter to substantially shred shreddable material passing through the conduit.

* * * * *

UNITED STATES PATENT AND TRADEMARK OFFICE
CERTIFICATE OF CORRECTION

PATENT NO. : 5,020,309

DATED : 6/4/91

INVENTOR(S) : Hopkins

It is certified that error appears in the above-identified patent and that said Letters Patent is hereby corrected as shown below:

> Claim 19, column 10, line 60, after "revolve" insert
> --the string-type cutter to cut leaves as they pass
> through the conduit tube.--

Signed and Sealed this

Twenty-ninth Day of September, 1992

Attest:

DOUGLAS B. COMER

*Attesting Officer*   *Acting Commissioner of Patents and Trademarks*